June 3, 1930.   J. J. RATTY   1,762,030
COFFEE OR TOBACCO HUMIDOR
Filed Jan. 5, 1929
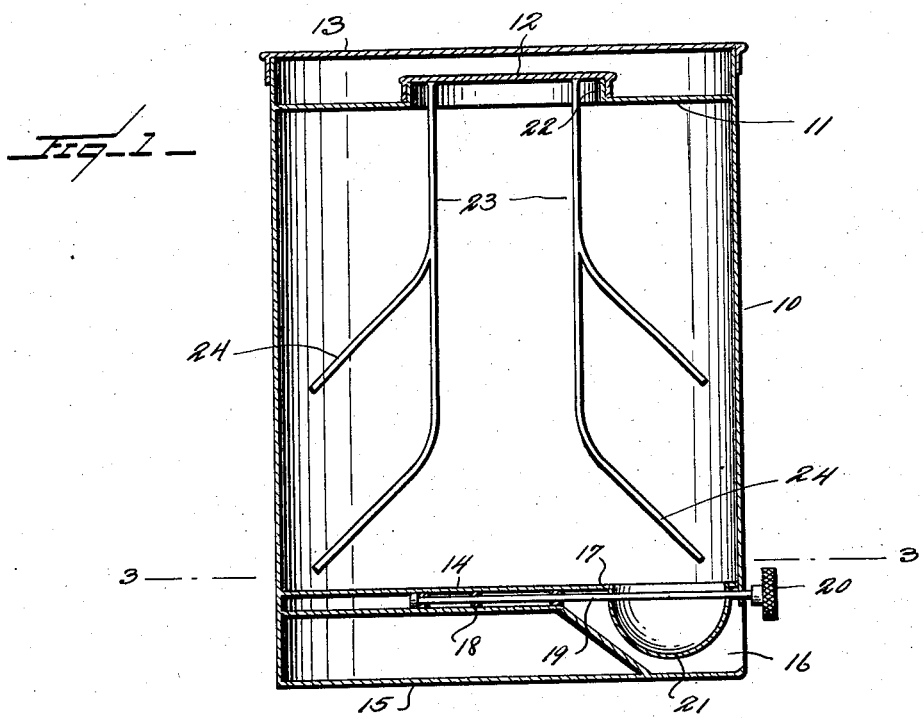
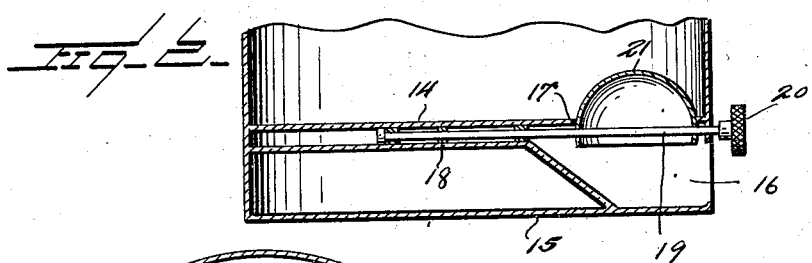
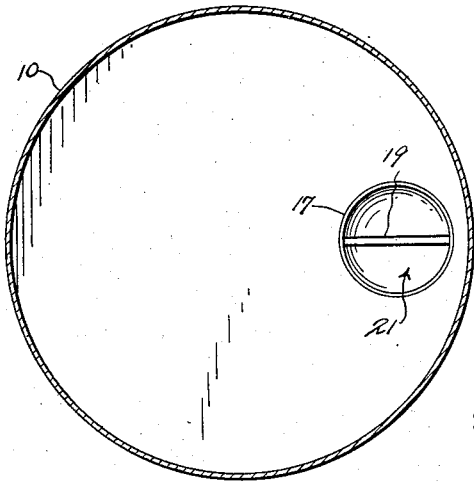
Inventor
J. J. Ratty
By Watson E. Coleman
Attorney Patented June 3, 1930

1,762,030

UNITED STATES PATENT OFFICE

JOHN J. RATTY, OF NEW YORK, N. Y.

COFFEE OR TOBACCO HUMIDOR

Application filed January 5, 1929. Serial No. 330,686.

This invention relates to cans or containers for holding coffee, tobacco or other products which are liable to be affected by moisture or which are liable to loose their aroma.

The general object of the invention is to provide a can or container which is particularly adapted for this purpose in view of the fact that the contents of the can may be taken therefrom little by little as desired without admitting more than a minimum amount of air or moisture. It is well-known that coffee loses its aroma very quickly as soon as a container is opened, this applying particularly to powdered or pulverized coffee. So long as the container is closed and air does not have access to the interior, the coffee will keep in good condition but it very quickly deteriorates when air has access thereto.

A further object is to provide a device of this character having a measuring cup disposed between a false bottom and the bottom of the container, which when shifted, will discharge its contents while at the same time closing the discharge aperture of the container.

Other objects will appear in the course of the following description.

My invention is illustrated in the accompanying drawings, wherein—

Figure 1 is a vertical sectional view of a container constructed in accordance with my invention;

Figure 2 is a fragmentary vertical section showing the cup inverted;

Figure 3 is a section on the line 3—3 of Figure 1.

Referring to these drawings, 10 designates the body of the can or container. This has the inner septum or top 11 having a central opening provided with a lid 12 and an outer cover 13 engages the upper end of the body so that these two covers, namely the part 11 and the part 13, will prevent any access of air to the interior of the container and in a sense insulate its contents. The lower end of the container is provided with a false bottom 14 and below this with the lower end or bottom 15. There is a discharge opening 16 opening into the space between the bottoms 14 and 15.

The false bottom 14 is provided with an opening 17 and disposed below this false bottom and mounted in guides 18 is a spindle or stem 19 having a knob 20 at its outer end. This spindle carries upon it the cup 21 which is so formed as to exactly fill the aperture 17. When this spindle is turned to one position the cup will be dependent and will, of course, be filled with coffee, tobacco, or other granular or pulverized material in the can.

When the knob 20 is turned, the spindle turns carrying with it the cup 21 from its receiving to its dumping position.

In the use of this device, whenever it is desired to discharge the contents of the can, the cup 21, which preferably holds about a table-spoonful, is rotated from its depending to its inverted position which will discharge the contents on to the bottom 15 and out through the opening 16. The rotation of the cup does not in any way open the can to the inlet of air and thus practically no air can pass into the interior of the can and tobacco, coffee or other products cannot be affected thereby.

Preferably, though I do not wish to be limited to this, the lid 12 is rotatable upon the outwardly extending flanges 22 and this closure carries upon it the stirrers or agitators consisting of the downwardly extending wires 23 having outwardly extending branches 24. If by chance, the material should become clogged within this container, it is only necessary to rotate this closure 12 and agitate the contents to break up any adhesions and permit the free discharge of the material into the cup.

I claim:—

1. A container of the character described comprising a body having a false top provided with an opening and a closure therefor and a top extending over the false top, the container having a false bottom above the lower end of the container and the side of the container below this false bottom having a discharge opening, the false bottom of the container also having a discharge opening, a spindle mounted upon the false bottom and extending across the discharge opening and carrying a measuring cup which fits the opening in the false bottom, the spindle having means whereby it may be oscillated to carry the cup from a receiving to a discharge position and vice versa.

2. A container of the character described, comprising a body having a false top and a cover, the false top having a central opening provided with a rotatable closure, means at the lower end of the body whereby material contained therein may be discharged, and stirrers carried by the rotatable closure and depending into the interior of the body.

In testimony whereof I hereunto affix my signature.

JOHN J. RATTY.